US009420661B2

(12) United States Patent
Martzall (10) Patent No.: US 9,420,661 B2
(45) Date of Patent: Aug. 16, 2016

(54) OUTDOOR LIGHTING FIXTURE

(71) Applicant: Lake Lite, Inc., Laotto, IN (US)

(72) Inventor: Jeffrey S. Martzall, Fort Wayne, IN (US)

(73) Assignee: Lake Lite, Inc., Laotto, IN (US)

( * ) Notice: Subject to any disclaimer, the term of this patent is extended or adjusted under 35 U.S.C. 154(b) by 41 days.

(21) Appl. No.: 14/523,339

(22) Filed: Oct. 24, 2014

(65) Prior Publication Data

US 2016/0040841 A1 Feb. 11, 2016

Related U.S. Application Data

(63) Continuation-in-part of application No. 14/453,297, filed on Aug. 6, 2014, now abandoned.

(51) Int. Cl.
| | | |
|---|---|---|
| *F21L 4/00* | (2006.01) |
| *H05B 33/08* | (2006.01) |
| *F21V 23/04* | (2006.01) |
| *F21V 31/00* | (2006.01) |
| *F21S 9/03* | (2006.01) |
| *H05B 37/02* | (2006.01) |
| *F21Y 101/02* | (2006.01) |
| *F21W 131/10* | (2006.01) |

(52) U.S. Cl.
CPC ............ *H05B 33/0854* (2013.01); *F21S 9/037* (2013.01); *F21V 23/04* (2013.01); *F21V 31/005* (2013.01); *H05B 33/0803* (2013.01); *H05B 37/0218* (2013.01); *F21W 2131/10* (2013.01); *F21Y 2101/02* (2013.01); *Y02B 20/346* (2013.01)

(58) Field of Classification Search
CPC ............ F21S 9/03; F21S 9/032; F21S 9/035; F21S 9/037; F21V 23/04; F21V 23/0428; F21V 23/0435; F21V 31/005; H05B 33/0854; H05B 33/0845; H05B 33/0803
See application file for complete search history.

(56) References Cited

U.S. PATENT DOCUMENTS

| 3,817,021 | A | 6/1974 | Bergey | |
|---|---|---|---|---|
| 6,120,165 | A | * | 9/2000 | Shalvi ........................... 362/276 |
| 6,802,621 | B2 | 10/2004 | Adeler | |
| 7,972,048 | B1 | * | 7/2011 | Lamborn ...................... 362/541 |
| 2004/0008517 | A1 | 1/2004 | Bixler | |
| 2005/0135101 | A1 | * | 6/2005 | Richmond .................... 362/276 |
| 2006/0146534 | A1 | * | 7/2006 | Morton et al. ................ 362/253 |
| 2007/0041193 | A1 | * | 2/2007 | Wong et al. ................... 362/276 |

(Continued)

FOREIGN PATENT DOCUMENTS

DE 202011103050 U1 * 12/2011

OTHER PUBLICATIONS

Gaumann, Solar light, Dec. 28, 2011, English translation.*

*Primary Examiner* — Renee Chavez
*Assistant Examiner* — James Endo
(74) *Attorney, Agent, or Firm* — Baker & Hostetler LLP (57) ABSTRACT

According to one aspect of the present disclosure, an outdoor lighting fixture, including a solar panel, light source, rechargeable battery, and control circuit enclosed within a reversibly sealed housing, further includes a magnetic switch in communication with the control circuit. The switch enables an operator to adjust the settings and functions of the fixture without opening the housing, which would expose the control circuit, battery, light source, and other electrical components to the environment. In certain embodiments, the light source is one or more light emitting diodes powered by the solar panel via the battery and control circuit.

19 Claims, 5 Drawing Sheets

(56) References Cited

U.S. PATENT DOCUMENTS

| | | | |
|---|---|---|---|
| 2007/0047224 A1 | 3/2007 | Lee | |
| 2008/0060917 A1* | 3/2008 | Chia-Li et al. | 200/60 |
| 2009/0196041 A1* | 8/2009 | Joseph | F21S 8/081 |
| | | | 362/276 |
| 2010/0327766 A1* | 12/2010 | Recker et al. | 315/291 |
| 2011/0025437 A1* | 2/2011 | Preaux | 335/207 |
| 2011/0235313 A1* | 9/2011 | Canella | 362/157 |
| 2012/0069581 A1* | 3/2012 | Chen | 362/311.14 |
| 2012/0182725 A1* | 7/2012 | King | 362/183 |
| 2012/0188752 A1* | 7/2012 | Chen | 362/183 |
| 2012/0314404 A1* | 12/2012 | Harshaw | 362/183 |
| 2013/0049609 A1* | 2/2013 | Browder | 315/159 |
| 2013/0169189 A1* | 7/2013 | Bernard | H05B 37/0272 |
| | | | 315/307 |

* cited by examiner

OUTDOOR LIGHTING FIXTURE

CROSS REFERENCE TO RELATED APPLICATIONS

The present application is a continuation-in-part of U.S. application Ser. No. 14/453,297, filed Aug. 6, 2014, which is incorporated herein by reference.

TECHNICAL FIELD

The present disclosure generally relates to lighting fixtures, in particular outdoor solar-powered lighting fixtures.

BACKGROUND

Outdoor general area lighting and accent lighting is often desired in remote locations where it is inconvenient or expensive to run electrical lines to power multiple lighting fixtures. Moreover, there are costs associated with powering remote lighting, and those costs are higher when the lighting is used throughout the dark, nighttime hours. Further, the use of conventional battery technology to power remote lighting fixtures, instead of electrical power lines, may be limited by the amp-hours of charge capable of being stored in a given battery.

Solar-powered lighting, having a solar panel connected to a rechargeable battery connected to a light source, offers a potential solution. However, solar-powered outdoor lighting faces a number of reliability challenges, including weatherability and limited power storage capacity. Weatherability refers to the ability of an outdoor fixture to maintain a sealed environment to protect its electrical components from exposure to ambient moisture while also enabling the replacement of key components, such as a battery or a light source. The inherently limited power storage capacity of the battery may be extended via various power-saving modes of operation; however, changing between modes traditionally requires opening the lighting fixture, which could negatively affect the weatherability of the fixture. Accordingly, there remains a need for further contributions in this area of technology.

SUMMARY

According to one aspect of the present disclosure, an outdoor lighting fixture, including a solar panel, light source, rechargeable battery, and control circuit enclosed within a reversibly sealed housing, further includes a magnetic switch in communication with the control circuit. The switch enables an operator to adjust the settings and functions of the fixture without opening the housing, which would expose the control circuit, battery, light source, and other electrical components to the environment. In certain embodiments, the light source is one or more light emitting diodes powered by the solar panel via the battery and control circuit.

This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

According to one aspect of the present disclosure, an outdoor lighting fixture, including a solar panel, light source, rechargeable battery, and control circuit enclosed within a reversibly sealed housing, further includes a magnetic switch in communication with the control circuit. The switch enables an operator to adjust the settings and functions of the fixture without opening the housing, which would expose the control circuit, battery, light source, and other electrical components to the environment. In certain embodiments, the light source is one or more light emitting diodes powered by the solar panel via the battery and control circuit. The disclosed lighting fixture is more reliable than conventional lighting fixtures, which must be adjusted either by exterior switches that may be prone to weather-related failures or by opening the fixture, which can introduce moisture, contaminants, and leak paths into the fixture.

Figure 1:
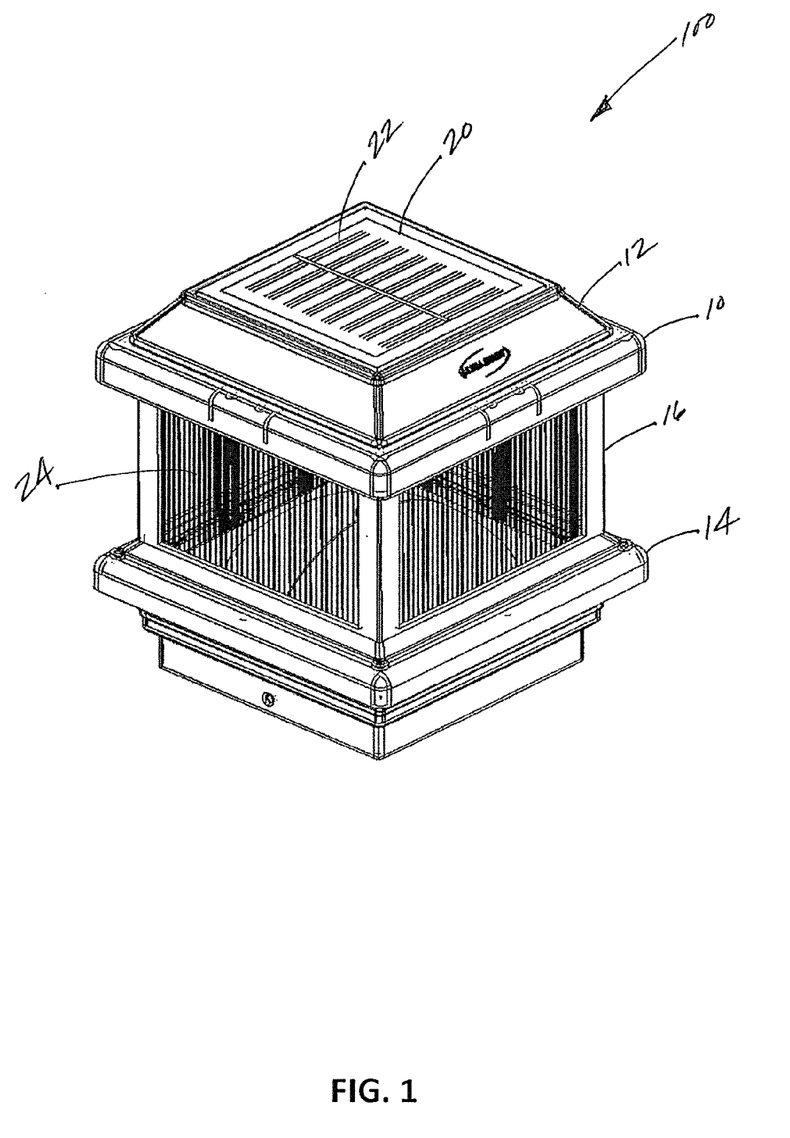
FIG. 1 shows a perspective view of an embodiment of a lighting fixture according to the present disclosure.

A lighting fixture 100 according to at least one embodiment of the present disclosure is shown in FIG. 1. As shown in FIG. 1, the fixture 100 may include a housing having a top 12, a bottom 14, and sides 16 structured to enclose electrical components of the fixture 100. At least a portion of the sides 16 may include a lens 24. Each lens 24 may be a transparent or translucent material to enable light emanating from within the housing to be emitting therefrom. Though the fixture 100 illustrated in FIG. 1 has a generally square shape, the fixture 100 may have any suitable shape. As one non-limiting example, the fixture 100 may be generally cylindrical. In such an embodiment, the top 12 may be largely circular, the sides 16 may be comprised of one, generally cylindrical wall, and the fixture 100 may include an arcuate or cylindrical lens 24. Alternatively, in certain embodiments, the lens 24 may be incorporated into the top 12, bottom 14, or sides 16 of the housing 10.

The fixture 100 may include a solar panel 20. The solar panel 20 may be disposed behind the top 12 within the housing 10 to provide protection from direct exposure to the environment. In such an embodiment, at least a portion of the top 12 may be a translucent or transparent material to enable light to pass therethrough and fall incident upon the solar panel 20. The solar panel 20 may include a plurality of photovoltaic cells 22 electrically connected to one another in either series or parallel to comprise a photovoltaic array (i.e., solar panel). The plurality of photovoltaic cells 22 operate to convert light (e.g., solar radiation) incident upon the solar panel 20 into direct current electricity via semiconductor materials known to exhibit the photovoltaic effect, whereby photons of light (e.g., from solar radiation) excite electrons in the semiconductor to a higher state of energy, enabling them to act as charge carriers for an electric current. The plurality of photovoltaic cells 22 may be made of materials such as monocrystalline silicon, polycrystalline silicon, amorphous silicon, cadmium telluride, copper indium gallium selenide/sulfide, or any suitable photovoltaic material. In certain embodiments, the solar panel 20 may be recessed into the top 12. In such an embodiment, the solar panel 20 may be fixed to the top 12 by an adhesive or other suitable means such that the photovoltaic cells 22 are sealed from exposure to the environment.

Figure 2:
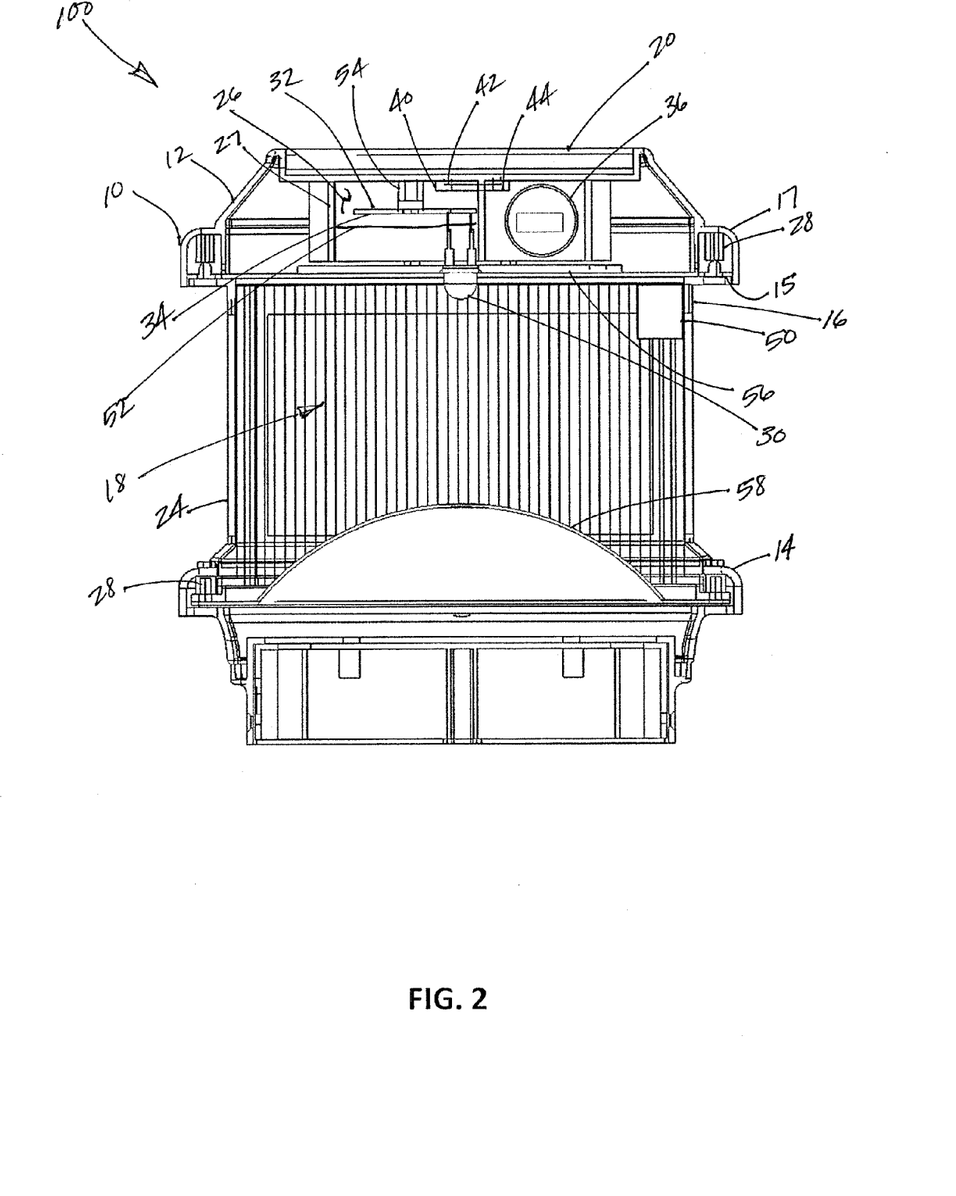
FIG. 2 shows a cross-sectional view taken at a plane A-A of the embodiment of a lighting fixture of FIG. 1 according to the present disclosure.

As shown in FIG. 2, the housing 10 of the fixture 100 may include one or more seals 28 to isolate an interior 18 of the housing 10 from the environment, thereby enabling the housing 10 to be reversibly and hermetically sealed. The seal 28 may be disposed within a channel 17, the channel 17 extending from the periphery of the top 12. The seal 28 may seat against an opposing flange 15 extending from the sides 16 to form a joint. In certain embodiments, the housing 10 may include another channel 17 extending from the bottom 14 with another seal 28 disposed therein, seating against another flange 15 extending from the bottom 14 to form a joint. In an alternative embodiment, instead of the seal 28, the bottom 14 or top 12 may be sealed to the sides 16 by alternate means. By way of non-limiting examples, the top 12, bottom 14 and sides 16 may be sealed from the environment by a sealant (e.g., such as an adhesive) or by a weld (e.g., sonic or vibration weld). In certain embodiments, the bottom 14 and the sides 16 may be formed as an integral structure without joints, and only the top 12 may be sealed to the sides 16. As the preceding examples demonstrate, the construction of the housing 10 may adopt any suitable configuration that enables the housing 10 to be reversibly and hermetically sealed from the environment, thereby enabling access to the interior 18 for maintenance of electrical components within the housing 10 as described further herein. To enable such a reversible hermetical seal, the joint or joints of the housing 10 may be secured using a plurality of fasteners (e.g., screws), a hinge and opposing latch (e.g., a snap-release), or any other suitable reversible means.

The fixture 100 may include electrical components disposed within the housing 10. As shown in FIG. 2, the fixture 100 may include a light source 30 and a switch 40, both electrically connected to a circuit board 32. The fixture 100 may further include a battery 36 electrically connected to the circuit board 32, the battery 36 capable of storing and supplying electrical power to the light source 30 and other electrical components of the fixture 100. The fixture 100 may include contacts (not shown), such as an anode contact and a cathode contact disposed in the compartment, whereby the contacts are capable of making electrical contact with the battery 36 and conducting electricity from the battery 36 to the circuit board 32. In certain embodiments, the circuit board 32 may be attached to one or more bosses 54 protruding from the housing 10.

The fixture 100 may further include a compartment 26 within the interior 18 of the housing 10. In the embodiment shown in FIG. 2, the compartment 26 is depicted at least partially within the top 12; however, the compartment 26 may be positioned in any suitable area of the housing 10. In at least one embodiment, the compartment 26 may include a compartment wall 27 defining the compartment 26. In certain embodiments, at least a portion of the compartment 26 may be filled with a potting material 52 to at least partially encapsulate the circuit board 32. The potting material 52 may be any suitable material capable of encapsulating the circuit board 32, thereby isolating and protecting the circuit board 32 and its constituent components from moisture and other contaminants that may intrude into the housing 10. As non-limiting examples, the potting material 52 may be a polyurethane, epoxy, or silicone based material.

In at least one embodiment of the present disclosure, the battery 36 may be a rechargeable battery that is capable of accepting and storing an electrical charge generated when the solar panel 20 is exposed to a sufficient intensity of light energy. Further, the battery 36 is capable of providing sufficient electrical power to energize the light source 30 via a control circuit 34 mounted to the circuit board 32. In at least one embodiment, the battery 36 may use any suitable rechargeable battery chemistry, including, but not limited to, nickel cadmium (NiCd), nickel metal hydride (NiMH), lithium iron phosphate (LiFePO4), and lithium-ion (Li-ion). Further, the battery 36 may include any suitable size, including but not limited to, AA, AAA, AAAA, 1/2AA, and 1/3AAA. In embodiments including a LiFePO4 type, the battery 36 may include such sizes as, but not limited to, 14430 and 18500, having capacities of around 1000 milliamp-hours (mAh) at 3.2 Volts (V). In at least one embodiment, the battery 36 may be a 1.2 V, 120 mAhr, 1/3AAA NiMH battery. In certain embodiments, the battery 36 may include two or more power storage devices electrically connected to the circuit board 32. In addition to powering the light source 30, the battery 36 may supply power to the control circuit 34 and other electrical components of the fixture 100.

In at least one embodiment according to the present disclosure, the light source 30 may be a light emitting diode ("LED"), including a semiconductor chip having a light emitting p-n junction for generating light, an electrically isolated metal base or slug, a bottom surface that may be in contact with, or coated with, a reflective material to reflect generated light outward, and a means of electrical connection. LEDs are relatively efficient on a lumen per Watt basis and may be suitable for applications, such as the fixture 100, where power is limited by the storage capacity of a battery. The light source 30 may include more than one light source. For example, in certain embodiments, the light source 30 may include multiple LEDs, each capable of emitting a different color of light. Additionally, the light source 30 may include more than one LED die mounted within a single LED device. In alternative embodiments, the light source 30 may be an incandescent bulb or any suitable source of light generated via electrical power.

The switch 40 may be any suitable device operable to generate an electrical signal to the circuit board 32. In certain embodiments, the switch 40 may be an electromechanical device including one or more contacts to open and close the flow of electricity to the light source 30 via the circuit board 32. In at least one embodiment, the switch 40 may be a reed switch responsive to a magnetic field, sometimes referred to as a magnetic switch, comprising an envelope 42 and a pair of reed contacts 44 that are spaced apart in an initial "open" state. The switch 40 may be actuated by a magnetic field (or more generally an electromagnetic field) brought in proximity with the switch 40, which will cause the contacts 44 to come together, thus completing an electrical circuit and providing a signal to the control circuit 34 without directly touching the switch 40. Electric current to energize the switch 40 may be supplied by the battery 36. In the absence of the magnetic field, the stiffness of the contacts 44 causes them to separate, thus opening the circuit. In alternative embodiments, the switch 40 may include a non-ferrous, initially-closed contact that opens when the ferrous initially-open contact closes. In such an embodiment, the magnetic field brought into proximity with the switch 40 may cause the contacts 44 to separate, thereby providing a null signal to the control circuit 34. In other alternative embodiments, the switch 40 may be any suitable device structured to and capable of being actuated by indirect, noncontact means, including but not limited to Bluetooth, wireless, infrared, or radio frequency switching means.

Figure 3:
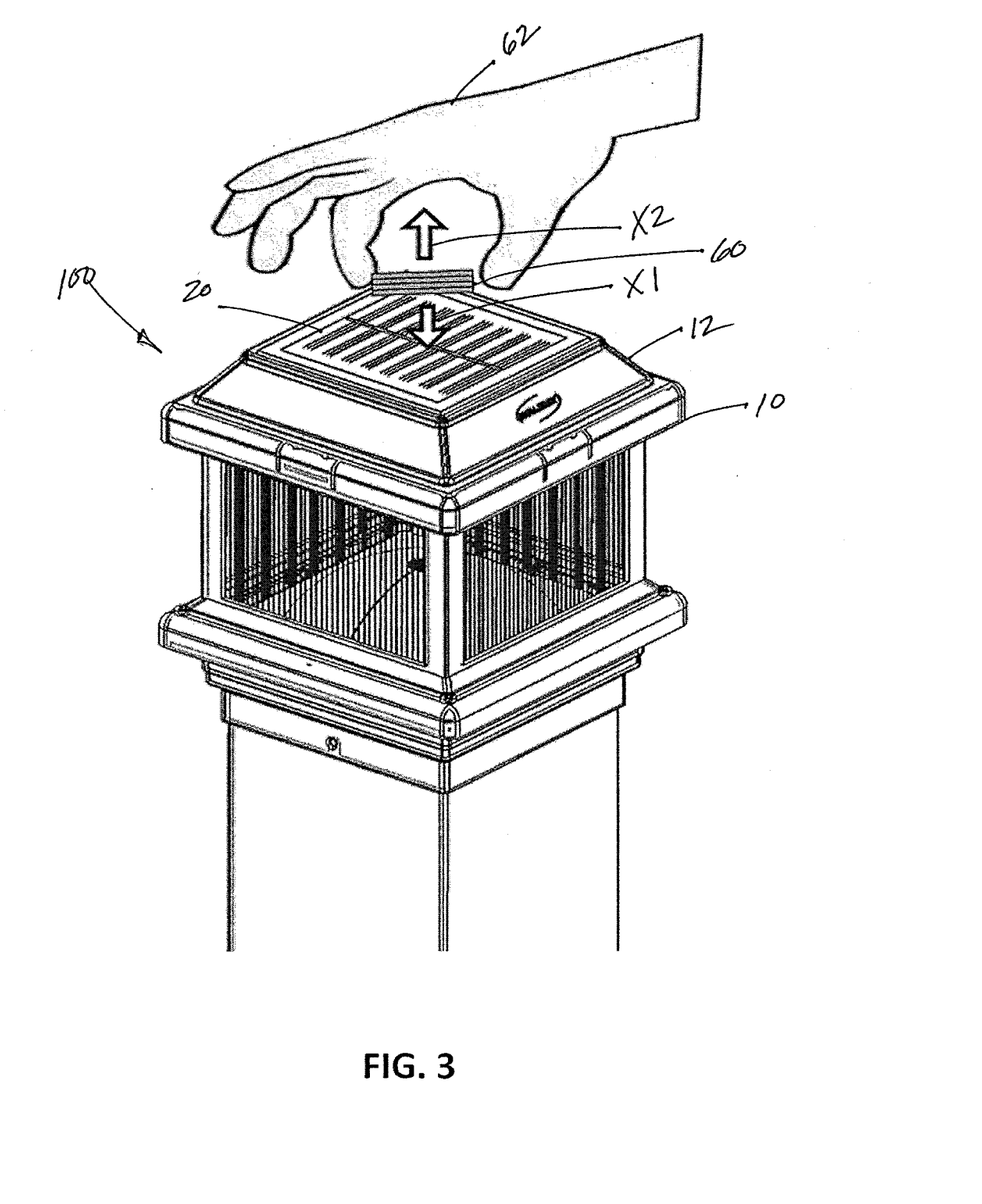
FIG. 3 shows a perspective view of an embodiment of a lighting fixture according to the present disclosure.

The magnetic field to actuate the switch 40 may be generated by any suitable means, including but not limited to an electromagnetic coil or a permanent magnet. In at least one embodiment, the switch 40 may be actuated by a permanent magnet brought in proximity with the switch 40. As illustrated in FIG. 3, an operator 62 may move a magnet 60 toward the fixture 100 generally in the direction of arrow X1 to activate the switch 40 (shown only in FIG. 2). The operator 62 may deactivate the switch 40 by moving the magnet 60 away from the fixture 100 generally in the direction of arrow X2. The controlling distance between the magnet 60 and the switch 40 needed to actuate the switch 40 is dependent on the strength of the magnet 60 and on whether other components are in the path in between given the specific location of the switch 40. FIG. 3 depicts the magnet 60 being brought in proximity with the top 12 of the housing 10 and the solar panel 20 because the embodiment illustrated in FIG. 2 shows the switch 40 disposed near the top 12 opposite the solar panel 20. However, the switch 40 may be positioned in any suitable location within the interior 18 of the housing 10. Accordingly, in embodiments where the switch 40 is located in other areas of the housing 10, or the fixture 100 more generally, the switch 40 may be actuated by bringing the magnet 60 (shown only in FIG. 3) within proximity of those areas.

The fixture 100 may include a sensor 50 in communication with the control circuit 34. The sensor 50 may be a motion detector, including but not limited to an ultrasonic, microwave, or passive infrared sensor, capable of indicating whether the light source 30 should be energized due to the presence of a person in the vicinity of the fixture 100. In such an embodiment, a signal communicated from the sensor 50 may energize the light source 30 via the control circuit 34 for a predetermine period of time. Alternatively, the sensor 50 may be another type of sensor. In certain embodiments, the fixture 100 may include more than one housing 10 whereby certain components, for example, the solar panel 20, circuit board 32, and battery 36 may be in one housing 10, and the light source 30 and lens 24 may be in another. In such embodiments, the light source 30 may be connected to the circuit board 32 by electrical conductive wires. Moreover, in at least one embodiment, the fixture 100 may include an upper reflector 56 and/or a lower reflector 58 disposed within the housing 10 and formed to direct light emitted by the light source 30 out of the housing 10.

Figure 4:
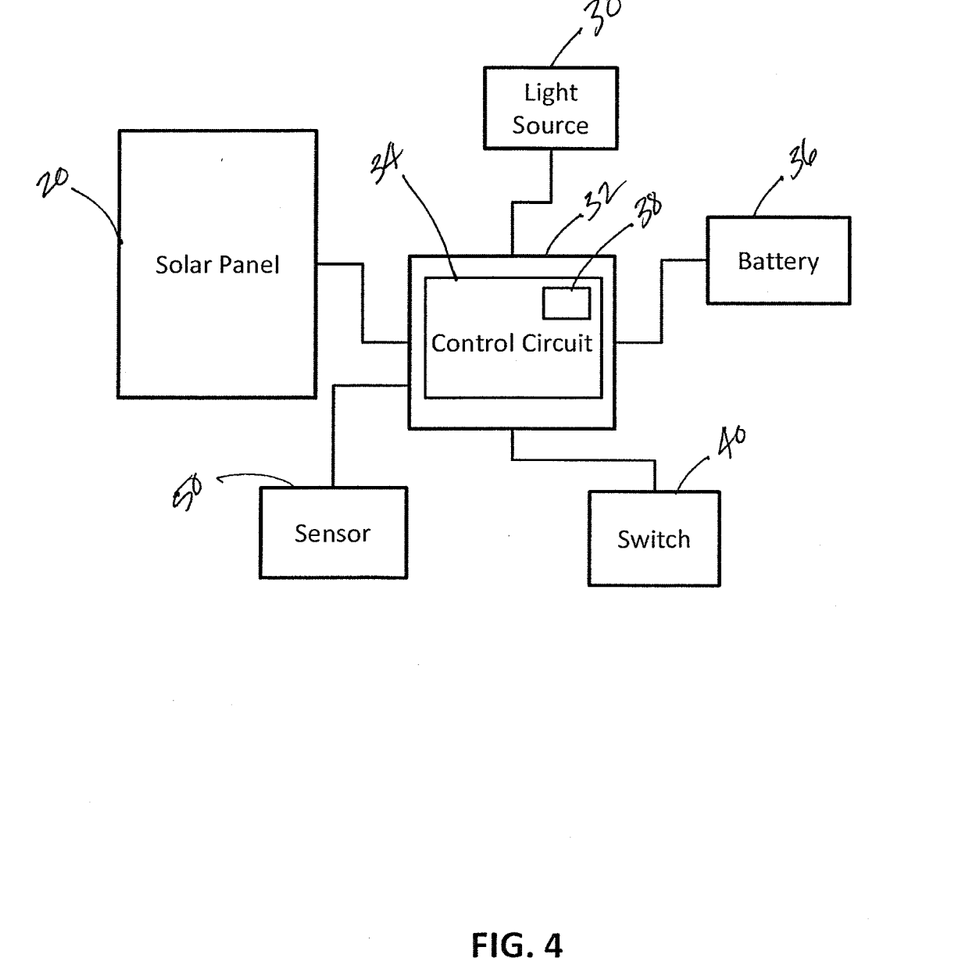
FIG. 4 shows a schematic diagram of an embodiment of a lighting fixture according to the present disclosure.

As shown in FIG. 4, the control circuit 34 mounted to the circuit board 32 may be in communication with the solar panel 20, the light source 30, the battery 36 and the switch 40. The control circuit 34 is structured to enable various power management functions for the fixture 100 and to enable adjustment thereof. The control circuit 34 may be capable of a power management function for automatic power control of the light source 30 and of the interface between the solar panel 20 and battery 36. For example, the control circuit 34 may be capable of automatically switching from a charging mode, in which electrical energy generated by the solar panel 20 is fed to and stored in the battery 36, to a power mode, in which electrical energy stored in the battery 36 is fed to the light source 30. The voltage of the solar panel 20 increases as the ambient light increases and decreases as the ambient light decreases. Consequently, the control circuit 34 may enable automatic on-off control, which energizes the light source 30 when the ambient light, and thus voltage from the solar panel 20, is below a prescribed level (i.e., dusk) and de-energizes the light source 30 when the ambient light, and thus voltage from the solar panel 20, is above a prescribed level (i.e., dawn), by monitoring the voltage of the solar panel 20. Further, the control circuit 34 may include constant current control circuitry that regulates the power provided to the light source 30 by the battery 36 at a prescribed current level, thereby protecting the light source 30 from undesirable conditions, such as voltage fluctuations and spikes. In at least one embodiment, the control circuit 34 may include a microprocessor 38 to execute one or more control algorithms, thereby enabling the power management functions disclosed herein. The control circuit 34 may further include a charge controller to control charging and discharging of the battery 36. Such a charge controller may ensure that the voltage of the battery 36 is neither driven too high by current from the solar panel 20 nor depleted too low from powering the light source 30.

The control circuit 34 may be structured to perform certain operations comprising a control structure to provide power management of the fixture 100. In certain embodiments, the control circuit 34 forms a portion of a processing subsystem that includes one or more computing devices having memory, processing, and/or communication hardware. The control circuit 34 may be a single device or a distributed device, and the functions of the control circuit 34 may be performed by hardware and/or software. The control circuit 34 can include one or more Arithmetic Logic Units (ALUs), Central Processing Units (CPUs), memories, limiters, conditioners, filters, format converters, or the like which are not shown to preserve clarity. In one form, the control circuit 34 is of a programmable variety that executes algorithms and processes data in accordance with operating logic that is defined by programming instructions (such as software or firmware). Alternatively or additionally, operating logic for the control circuit 34 can be at least partially defined by hardwired logic or other hardware. It should be appreciated that control circuit 34 can be exclusively dedicated to power and battery management of the fixture 100 or may further be used in the regulation, control, and activation of one or more other subsystems or aspects of the fixture 100.

In at least one embodiment according to the present disclosure, the control circuit 34 may enable additional power management functions and settings of the fixture 100. As non-limiting examples, the control circuit 34 may enable the power supplied to the light source 30 to be varied to change the intensity or brightness of the light source 30 or to change between lighting modes. Lighting modes may include a steady or constant "ON" mode and various flashing modes or patterns. Flashing modes may include steady flashing patterns of different periods, navigational patterns (e.g., patterns required by International Association of Marine Aids to Navigation and Lighthouse Authorities ("IALA") or United States Coast Guard regulations), or signaling patterns (e.g., Morse code). Further exemplary power management functions may include changing the ON/OFF trigger setpoint for the light source 30 and, in embodiments including more than one light source 30, changing between light sources 30. In embodiments including more than one battery 36, another power management function of the control circuit 34 may enable switching between available batteries 36 to power the light source 30 and control circuit 34. In embodiments including the sensor 50, the control circuit 34 may enable a signal from the sensor 50 to activate and/or deactivate the light source 30. As the preceding examples demonstrate, the control circuit 34 may enable any suitable power management function to control and adjust the operating mode of the fixture 100 and, particularly, the light source 30.

The switch 40 enables the operator to adjust the operational settings of the fixture 100, including the power management functions described herein. By actuating and deactivating the switch 40, the operator may toggle through the functions and settings enabled by the control circuit 34. Each actuation of the switch 40 may generate a signal to the control circuit 34. Each signal received by the control circuit 34 may be interpreted as a command, for example, to change the setting of a given function or to change from one function to the next. For example, in embodiments where the switch 40 is dedicated to the lighting modes, each actuation of the switch 40 may step from one setting to the next, such that the light source 30 may toggle from steady ON, to steady flashing, to navigational flashing, to signaling flashing, and then back to steady ON. As a further example, in embodiments where the switch 40 is dedicated to the lighting intensity or brightness of the light source 30, each actuation of the switch 40 may step from one intensity setting to the next. In another example, in embodiments including multiple light sources 30, each actuation of the switch 40 may step from one particular light source 30 to the next. As yet another example, in embodiments including the sensor 50, each actuation of the switch 40 may adjust the sensitivity of the sensor 50 to motion. Accordingly, the switch 40 enables the operator to step or toggle through a list of unlimited functions and settings with each actuation of the switch 40.

In at least one embodiment according to the present disclosure, the control circuit 34 may be structured to interpret and operate upon the duration the switch 40 is actuated. In such an embodiment, the control circuit 34 may interpret a relatively long-duration actuation of the switch 40 as a signal separate and distinct from a relatively short-duration actuation of the switch 40. Such a separate signal may be used by the control circuit 34 to adjust the operational settings and/or functions of the fixture 100. For example, the control circuit 34 may be configured or programmed to interpret a relatively long-duration actuation of the switch 40 as a signal to toggle from one function to the next, while relatively short-duration actuations of the switch 40 are interpreted as signals to toggle from one setting to the next within a given function. Thus, in such an embodiment, the control circuit 34 may operate upon a duration of the actuation of the switch 40 to distinguish between a signal to adjust the power management functions and a signal to adjust the settings thereof.

As a further example, the control circuit 34 may be programmed to interpret a five-second long actuation of the switch 40, whereby the magnet 60 is brought within sufficient proximity of the switch 40 for about five seconds, as a signal to toggle between brightness control of the light source 30 and color control of the light source 30. In the same embodiment, the control circuit 34 may be programmed to interpret a one-second long actuation of the switch 40, whereby the magnet 60 is brought within sufficient proximity of the switch 40 for at least about one second but no more than about two seconds, as a signal to toggle between levels of brightness of the light source 30 or color settings of the light source 30, depending on which function has been set or selected by the previous long-duration actuation. Accordingly, when the brightness function is selected, successive short-duration actuations may incrementally increase the brightness level of the light source 30 until looping back to the lowest brightness setting. Moreover, when the color function is selected, successive short-duration actuations may incrementally change the color or colors of the light source 30 until looping back to the first color setting. Though the preceding example includes only two functions, brightness and color, the control circuit 34 may be configured to cycle through any number of operational functions and settings as described further herein.

Figure 5:
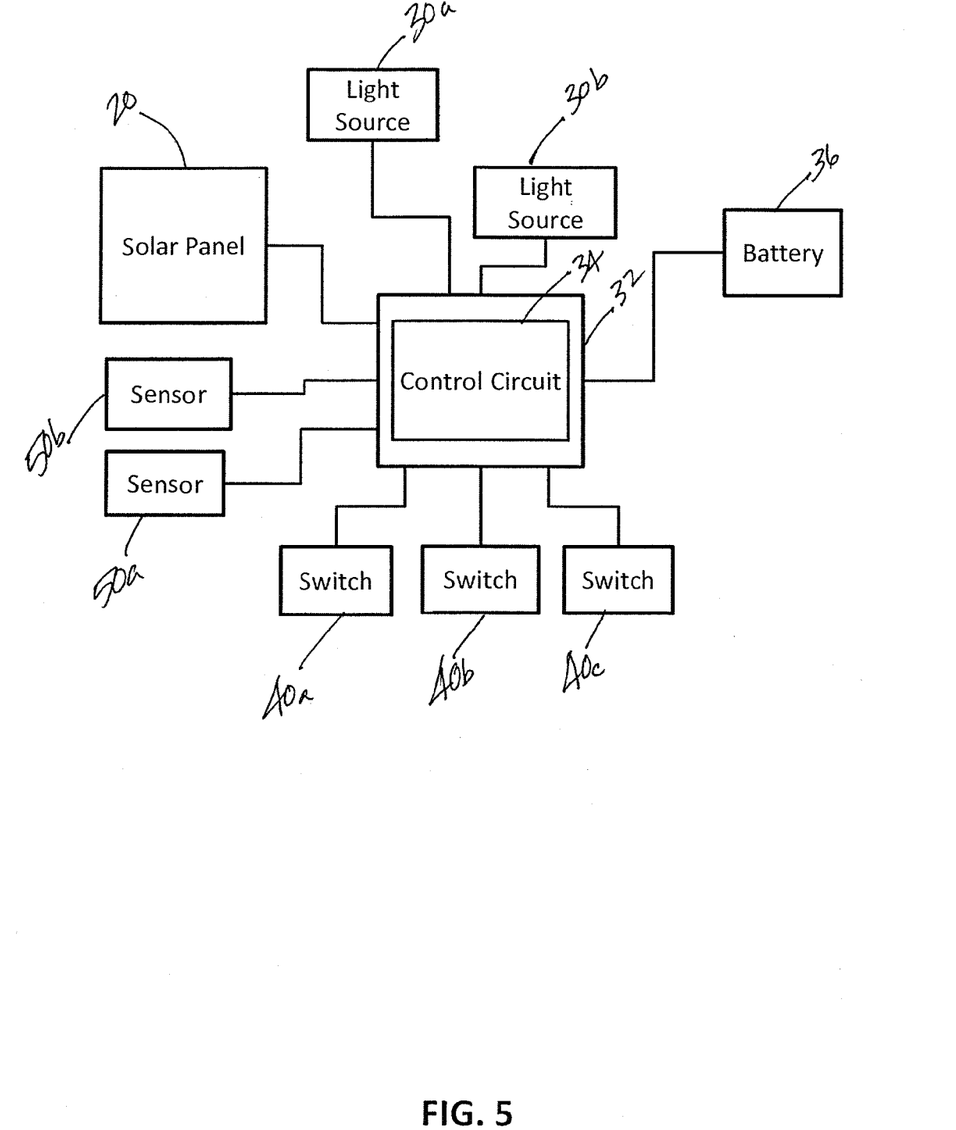
FIG. 5 shows a schematic diagram of an alternative embodiment of a lighting fixture according to the present disclosure.

In at least one embodiment according to the present disclosure, the fixture 100 may include more than one switch 40 in communication with the control circuit 34 as shown in FIG. 5. The fixture 100 may include three switches 40a, 40b, 40c; two light sources 30a, 30b; and two sensors 50a, 50b. In such an embodiment, each switch 40 may be employed to adjust the settings of a different function of the control circuit 34. For example, the switch 40a may adjust the lighting modes of the light source 30, while the switch 40b may adjust whether light source 30a or light source 30b is energized. Moreover, the switch 40c may enable adjustment of yet another setting and/or function of the control circuit 34 such as, for instance, manual ON/OFF control of the light source 30 to override a pre-programmed scheme for energizing the light source 30. The switches 40a, 40b, 40c may be disposed within the housing 10 at sufficient distance from one another that actuation of one switch 40 does not inadvertently actuate another switch 40, specifically where the switches 40a, 40b, 40c are magnetic switches actuated by proximity to a magnetic field. For example, in such embodiments, the switches 40a, 40b, 40c may be positioned on opposing or adjacent sides 16 of the housing 10.

In embodiments where the switch 40 is a switch structured to be actuated by indirect, noncontact means, such as a magnetic switch, the switch 40 enables control of the fixture 100 and the light source 30 without requiring that the housing be opened to access the control circuit 34 and other electrical components of the fixture 100 (i.e., the light source 30, battery 36, or circuit board 32). Opening and resealing a housing of a conventional lighting fixture to adjust settings and functions can be troublesome and time-consuming, which may dissuade operators from making adjustments that can enhance the performance of the fixture under different operating conditions as described further herein. Moreover, the switch 40 may eliminate the need for exterior switches, which are commonly used in conventional lighting fixtures. Exterior switches could reduce the reliability and weatherability of a conventional lighting fixture by introducing a potential leak path for ambient moisture that could damage the electrical components and cause failures. Exterior switches could also wear and fail, detract from the aesthetic appearance of the lighting fixture, and/or be susceptible to tampering and other reliability issues. Requiring that the housing be opened to adjust settings and functions increases the risk of allowing environmental moisture to intrude into the interior of the fixture and of incorrectly reassembling the fixture, thereby introducing a leak path into the conventional lighting fixture.

The performance of solar-powered outdoor lighting is generally dependent upon the amount of daylight exposure such a lighting fixture receives from day to day. Seasonal variation in daylight hours means that in winter months the fixture will receive less charging power than in summer months due to fewer daylight hours. At the same time, the winter months also include more dark, nighttime hours during which the demand for lighting is greater. Moreover, the seasonal variation in daylight hours is more pronounced at higher latitudes where the lower angle of sun limits the charging power generated by a solar panel. Aside from the global position of the fixture, the local surroundings may further impact performance. For example, the fixture may be placed at a site in the shade of a tree, house, or other structure that may at least partially limit the charging power generated by a solar panel. Accordingly, the performance requirements for a solar-powered fixture may vary throughout a year and according to location.

To address the wide variety of performance requirements, the power management functions of the fixture 100 provide the operator with different modes of operation that may facilitate extending the charging power received via the solar panel 20 and conserving stored power in the battery 36. Moreover, the switch 40 enables the operator to make these performance-enhancing adjustments quickly and easily, which increases the value of the fixture 100 to the operator by enabling optimized performance without the trouble and potential reliability issues of opening and resealing the housing. Therefore, unlike conventional lighting fixtures, the fixture 100 including the magnetic switch 40 enables control of the fixture 100 and the light source 30 without introducing potential reliability and weatherability problems. Because the switch 40 enables the power management functions of the fixture 100 to be adjusted without exterior switches or opening the housing 10, which exposes the interior 18 to the environment, the fixture 100 is more reliable than conventional lighting fixtures and is more easily and quickly controlled and adjusted. Moreover, in embodiments where the switch 40 is a magnetic switch, the fixture 100 may be less expensive to manufacture relative to fixtures using Bluetooth, wireless, infrared, radio frequency or other indirect, noncontact communication means. Therefore, the fixture 100 enables more reliable control and operation than conventional lighting fixtures.

As is evident from the figure and text presented above, a variety of embodiments according to the present disclosure are contemplated. Such system embodiments may be employed in a variety of methods, processes, procedures, steps, and operations as a means of controlling a solar-powered light fixture. While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

The invention claimed is:

1. A lighting device comprising:
a control circuit;
a photovoltaic array in electrical communication with the control circuit;
a light source in electrical communication with the control circuit;
a battery in electrical communication with the control circuit, the photovoltaic array and the light source, the battery structured to receive and store an electric charge from the photovoltaic array and to supply electric current to the light source;
and a switch in electrical communication with the control circuit, the switch structured to be actuated by an electromagnetic field,
wherein the control circuit is configured to control functions and settings of the function, the functions including the power supplied to the light source, the intensity of the light source, and the color of the light source based upon actuation of the switch, and wherein the control circuit is further configured to interpret a first duration the electromagnetic field is positioned within sufficient proximity of the switch to toggle between each of the functions and to interpret a second duration to control incremental changes to the settings of each respective function.

2. The lighting device of claim 1, wherein the switch comprises a magnetic reed switch.

3. The lighting device of claim 1, wherein the light source comprises a light emitting diode.

4. The lighting device of claim 1, wherein the battery is a rechargeable battery.

5. The lighting device of claim 1, the device further comprising a motion detector in communication with the control circuit.

6. The lighting device of claim 1, wherein the control circuit, light source, battery and switch are enclosed within a housing, and the photovoltaic array is disposed outside the housing.

7. The lighting device of claim 1, wherein the control circuit is further configured such that the first duration is a relatively long and the second duration is relatively short.

8. The lighting device of claim 1, wherein the first duration is about five seconds and the second duration is at least about one second but no more than about two seconds.

9. A lighting fixture comprising:
a housing defining an interior, the housing structured to reversibly seal the interior from the environment;
a control circuit disposed within the interior, the control circuit including functions and settings of the functions;
a solar panel in electrical communication with the control circuit;
a light source disposed within the interior and in electrical communication with the control circuit;
a battery disposed within the interior and in electrical communication with the control circuit and the solar panel, the battery structured to receive and store an electric charge from the solar panel and to supply electric current to the light source; and
a switch disposed within the interior and in electrical communication with the control circuit, the switch structured to be actuated by an electromagnetic field,
wherein the control circuit is configured to control the functions and the settings of the function, the functions including the power supplied to the light source, the intensity of the light source, and the color of the light source based upon actuation of the switch, and wherein the control circuit is further configured to interpret a first duration the electromagnetic field is positioned within sufficient proximity of the switch to toggle between each of the functions and to interpret a second duration to control incremental changes to the settings of each respective function.

10. The lighting fixture of claim 9, wherein the switch is a magnetic reed switch.

11. The lighting device of claim 9, wherein the control circuit is further configured such that the first duration is a relatively long and the second duration is relatively short.

12. The lighting fixture of claim 9, wherein the control circuit is configured such that the first duration is about five seconds and the second duration is at least about one second but no more than about two seconds.

13. The lighting fixture of claim 9, wherein the light source comprises a light emitting diode.

14. The lighting fixture of claim 9, wherein the battery comprises a replaceable rechargeable battery.

15. The lighting fixture of claim 14, wherein the battery is a lithium iron phosphate battery.

16. The lighting fixture of claim 9, wherein the light source is an incandescent bulb.

17. The lighting fixture of claim 9, wherein the housing includes a compartment defined by a compartment wall in which at least a portion of the control circuit is positioned, the compartment including potting material that at least partially encapsulates the control circuit.

18. The lighting fixture of claim 17, wherein at least a portion of the switch is positioned within the compartment and is at least partially encapsulated by the potting material.

19. The lighting fixture of claim 9, the lighting fixture further comprising a motion detector in communication with the control circuit.

* * * * *